United States Patent
Valstar

[15] 3,680,086
[45] July 25, 1972

[54] GROUND MAPPING RADAR SYSTEM

[72] Inventor: Jacob E. Valstar, Orange, Calif.

[73] Assignee: North American Rockwell Corporation, El Segundo, Calif.

[22] Filed: Nov. 26, 1969

[21] Appl. No.: 880,821

[52] U.S. Cl. ................................343/5 CM, 343/5 ST
[51] Int. Cl. ..........................................G01s 9/02
[58] Field of Search ..................343/5 R, 5 CM, 5 PC, 5 ST

[56] References Cited

UNITED STATES PATENTS 2,611,126  9/1952  Irving..............................343/5 CM X

*Primary Examiner*—T. H. Tubbesing
*Attorney*—L. Lee Humphries, Fredrick Hamann and Rolf M. Pitts

[57] ABSTRACT

An azimuthally scanning, directionally ranging system adapted for airborne use in a mapping application. Means cooperating with an autonavigation system compensates for system platform motion occurring during each azimuthal scan for referencing a mapping display to a preselected position and orientation in a preselected horizon plane. Navigation check point means cooperating with the ranging system determines motion of the system platform relative to a selected target, to allow monitoring of the navigation system and three-dimensional checkpointing.

14 Claims, 10 Drawing Figures

PATENTED JUL 25 1972 3,680,086

INVENTOR.
JACOB E. VALSTAR
BY Roger M. Pitts
ATTORNEY $n' = n\cos\phi - m\sin\phi$
$m' = m\cos\phi + n\sin\phi$

GROUND MAPPING RADAR SYSTEM

CROSS-REFERENCES TO RELATED APPLICATIONS

1. U.S. application, Ser. No. 747,781 filed July 22, 1968, by Jerome M. Page for Prediction Computation for Weapon Control.

BACKGROUND OF THE INVENTION

In the use of an azimuthally scanning directionally ranging system such as a radar system, adapted for airborne use, a plan position indicator (PPI) is conventionally employed to display the range trace signals received from different directions of a scanned azimuth sector for presenting a mapping display. In such mapping application, each radial line of the display, corresponding to a range trace signal, has a point of origin which corresponds to the platform position. The resulting display is a map displayed relative to the system platform position and heading, the radial lines having a common point of origin corresponding to such position.

It is to be appreciated, however, that the forward motion of the high speed aircraft or platform on which the radar system is mounted results in a change of position of the system relative to the terrain being mapped, over the interval of an azimuth scan. Thus, a measure of a distortion occurs in the mapping display. In other words, although the radial lines of the range trace signals are displayed as having a common point of origin, in the actual situation each successive range trace signal represents data from a progressively advanced position along the vehicle flight path. Accordingly, distortion occur in the position, orientation and shape of terrain features thus mapped, as to make difficult optimum utilization of the mapping data sensed by the radar system, including precise navigation and terminal guidance (for weapon delivery purposes).

Although precision inertial navigation systems are modernly available for aircraft navigation purposes, the performance of such systems is subject to drift over long intervals of time. Also, the terrain features of a given terminal area of interest may not be accurately known in the coordinate system employed by the navigation system, due to anomalies in the earth's shape and gravity field or due to lack of a prior knowledge of such terrain feature or of a cultured (man-made) target of recent origin.

Past integrated systems designs have combined the use of both radar and inertial navigation systems to effect certain useful functions such as terrain avoidance and fire control functions for a weapon platform or aircraft. For example, U.S. application, Ser. No. 747,781 filed July 22, 1968, by J. M. Page, assignor to North American Rockwell Corporation, assignee of the subject invention, teaches the combined utilization of a radar and inertial navigator in a fire control system application. U.S. Pat. No. 3,404,398 issued Oct. 1, 1968 to T. W. Hoban, et al., teaches the combined use of a radar and inertial navigation in an intermittent radar mapping application for terrain avoidance purposes. However, the displayed event in such mapping application is yet subject to distortion due to platform motion during the interval of each azimuth scan. Also, the inertial guidance system is yet subject to performance drift during the flight mission.

SUMMARY OF THE INVENTION

By means of the concept of the subject invention, there is provided an azimuthally-scanning, directionally ranging system having a display indicator and adapted for an airborne ground-mapping application of improved quality, and including navigation checkpointing means. There is also provided means adapted to cooperate with an inertial autonavigation system for compensation of the mapping display for system platform motion occurring during the interval of each azimuth scan, whereby the mapping display is referenced to a preselected position and orientation in a preselected horizon plane.

The navigation check pointing means cooperates with the directionally ranging system to determine the system platform position relative to a selected target or checkpoint and within a preselected coordinate system. Such platform position may then be compared with the position determination in such coordinate system provided by the inertial navigator, for purposes of monitoring the inertial navigator.

Thus, an integrated system combining a radar system and an inertial navigation system is provided for achieving an improved mapping display and for monitoring the inertial navigator and for terminal guidance of improved quality. Accordingly, it is an object of the invention to provide an improved directionally ranging system for navigation purposes.

It is another object of the invention to provide a ground mapping radar system of improved quality.

It is a further object to provide directionally ranging means for checkpoint monitoring of an inertial guidance system.

Still another object is to provide an airborne system for ground mapping display which is compensated for system platform motion.

These and other objects of the invention will become apparent from the following description, taken together with the accompanying drawings in which:

BRIEF DESCRIPTION OF THE DRAWINGS

In the figures, like reference charactors refer to like elements.

DESCRIPTION OF THE PREFERRED EMBODIMENTS

Figure 1:
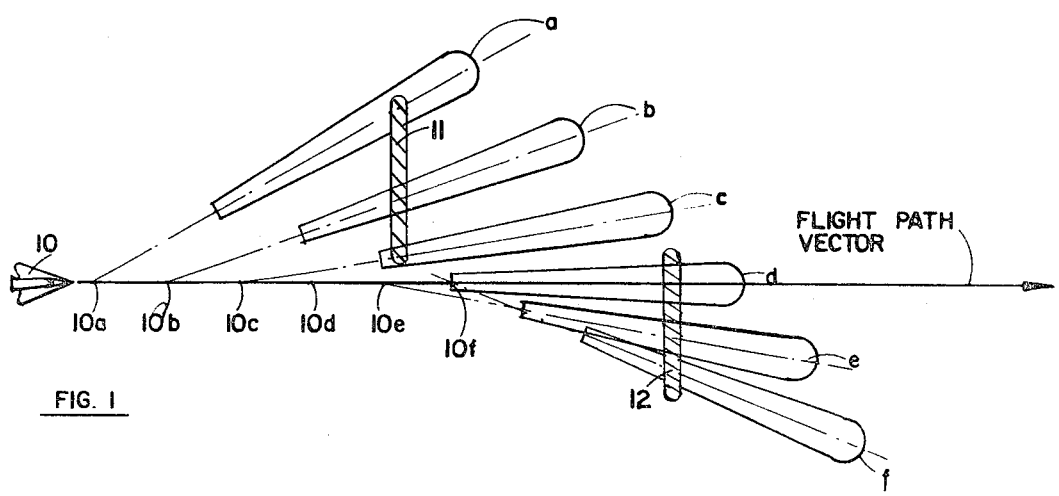
FIG. 1 is a representation of the geometry of a situation in which the concept of the invention may be advantageously employed.
Figure 2:
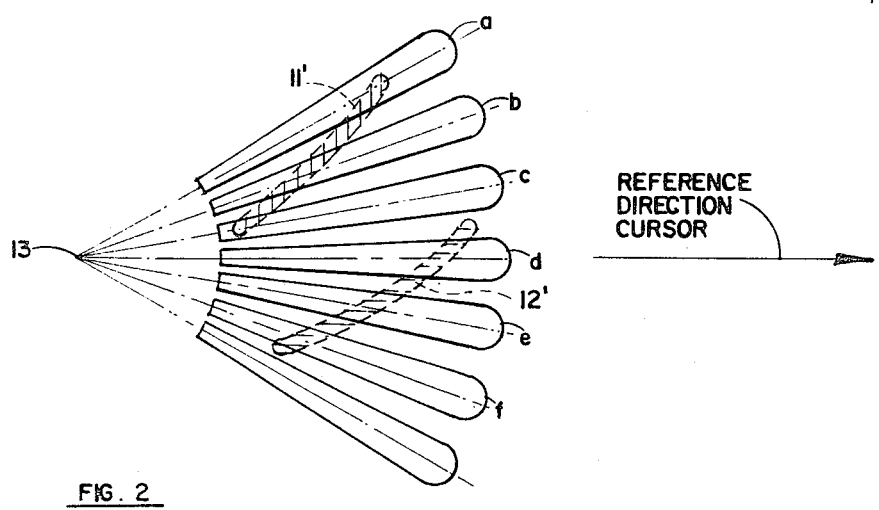
FIG. 2 is a representation of the prior art PPI display, indicating the data smear or image distortion resulting from system platform motion during the interval of an azimuth sector scan.

Referring to FIG. 1, there is illustrated a representative situation in which an airborne azimuthally scanning directionally ranging system may be employed in a ground mapping application, as a navigation aid. As the system platform or aircraft 10 moves along a selected flight path, an azimuthally scanning system (aboard such aircraft) scans from left to right across the flight path, as illustrated for example in FIG. 1, each sequential illumination pattern (a–f) fOfor a successive direction being obtained from a successive position (10a–10fb) of the aircraft 10 along the flight path. The data or received range trace signals for such successive illuminations patterns have been conventionally displayed, for ground mapping purposes, on a plan position indicator, as a plurality of radial lines originating at a common center 13 corresponding to the system platform position and at different directions corresponding to the system scan azimuth orientation associated with such range trace signal, as shown in FIG. 2. The number of displayed range trace signals per azimuth scan sector is determined as $\Delta\psi(PRF/\dot{\psi})$ (corresponding to the product of the azimuth scan sector ($\Delta\psi$) and the ratio of the system pulse repetition rate (PRF) to the azimuth scan rate, $\dot{\psi}$.

As may be readily appreciated from a comparison of FIGS. 1 and 2, the detection of non-moving ground targets 11 and 12 in the situation of FIG. 1 results in a corresponding display of such targets, as shown in FIG. 2. However, the shape, size and orientation of such displayed targets 11' and 12' in FIG. 2 is distorted due to the platform motion of platform 10 during the data sampling period of the pulsed directionally ranging system and corresponding to the spatial interval ($10a-10f$) in FIG. 1. In addition to the size, shape and attitude orientation of individual targets being distorted, the spatial relationship among them, or distances between them is distorted, all due to the time-varying distances at which the system samples different azimuths of the azimuth sector. Thus, the accuracy of the mapping display for navigational purposes is limited. Further, as the system scans in the opposite direction or from right to left, the sense or direction in which the target shapes and orientations are skewed, is reversed. Thus, the targets appear to jump around as the azimuth direction reverses, further aggravating precision navigation or map matching by such means. Moreover, because of such target smear, the data integration effect or property of the display tube phosphor of a display indicator is not fully utilized for distinguishing discrete target features from noise.

The slowness of the system sampling rate and the speed of the system platform motion in FIG. 1 have, of course, been exaggerated for convenience in exposition in illustrating in FIG. 2 the phenomenon which is overcome by means of the concept of the invention.

Still a further source of image distortion in a mapping radar display, relative to a navigation map against which such display may be compared, is the direct display of observed radar slant ranges, rather than displaying the horizontal range associated with such slant range. As may be appreciated from FIG. 3, the horizontal range $R_h$ of a terrain feature-to-be-mapped 11, relative to vehicle 10, may be determined from the radar, or slant, range R and the vertical look angle $\eta$ as $$R_h = R \cos \eta \qquad (1)$$

where the plane of the angle $\eta$ is not vertical, as in the case of a non-gimballed, phased-array antenna mounted on an aircraft, which is in a roll angle attitude $\phi$, then a further cosine direction matrix need be employed to convert the polar coordinate radar data from the coordinates of the vehicle 10 to a local earth coordinate system in a selected horizon plane. Where the altitude or vertical clearance Z of vehicle 10 relative to such terrain point 11 is also desired, such dimension may be determined from the slant and vertical look angle as:

$$Z = R \sin \eta, \qquad (2)$$

a transformation matrix being required where the plane of the angle $\eta$ is not vertical.

Figure 4:
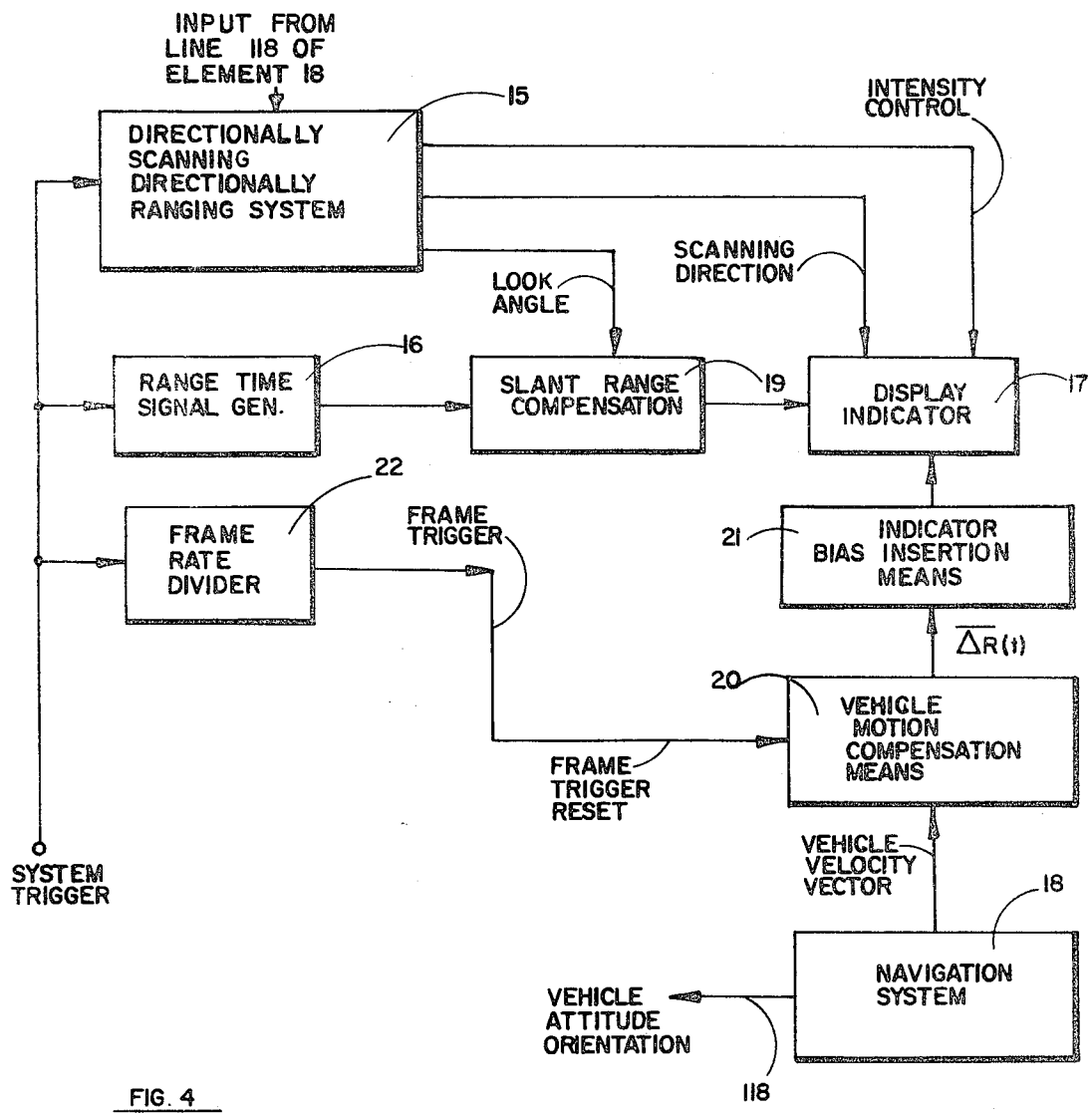
FIG. 4 is a block diagram of a system embodying one aspect of the inventive concept and including compensation for system platform motion.

Such deviation in the attitude orientation of the radar platform, as well as motion of the platform during an azimuth scan interval, may be observed by means of an inertial navigation system for purposes of mapping display compensation, as shown in FIG. 4.

Referring to FIG. 4, there is illustrated in block diagram form a system embodying one aspect of the inventive concept. There is provided azimuthally-scanning directionally-ranging means 15, such as a pulse-type radar system (adapted to be mounted on a movable platform such as an aircraft), and including a range time signal generator 16 in cooperation with a display indicator 17 of the plan position indicator (PPI) type, for displaying or mapping the range and azimuth of terrain viewed by system 15.

Figure 3:
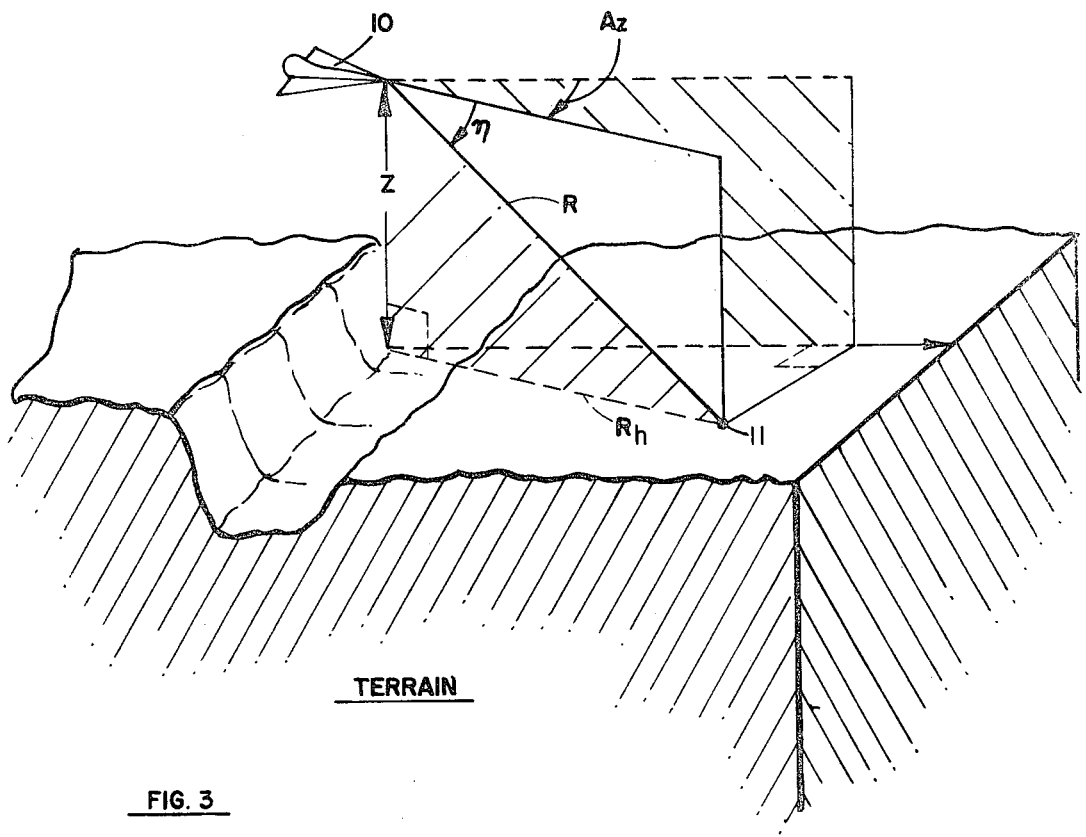
FIG. 3 is a representation of the geometry of an exemplary altimetry problem which is solved by means of the invention.

In a conventional mapping mode, ranging system 15 employs an azimuthally scanning perpendicular fan-shaped antenna beamwidth, the early range returns at a given azimuth direction of the antenna pattern occurring at a greater depression angle and the later, or far, range returns at such azimuth direction occurring at a shallower or lesser depression angle, as may be appreciated from FIG. 3. The azimuth direction of the return is presumed to be essentially that of the boresight direction of the azimuthally thin fan-shaped beam, while the perpendicular look angle direction within the perpendicular fan-shaped beam may be determined by conventional monopulse receiver techniques, as is well understood in the art.

Where ranging system 15 employs an electronically scanned phased-array type antenna, an inertial reference system and coordinate transformation means are included to transform the radar data from the polar coordinates of the vehicle or platform to a local inertial or earth coordinate system for mapping purposes. Alternatively, such transformation may be employed to space stabilize the scanning control of such array to an inertial reference. Such coordinate transformations are well understood in the airborne systems application of phased array antennas, and hence are not shown explicitly in the arrangement of FIG. 4. An inertial reference for such transformation or space stabilization purposes may be provided by an inertial navigation system 18.

Figure 8:
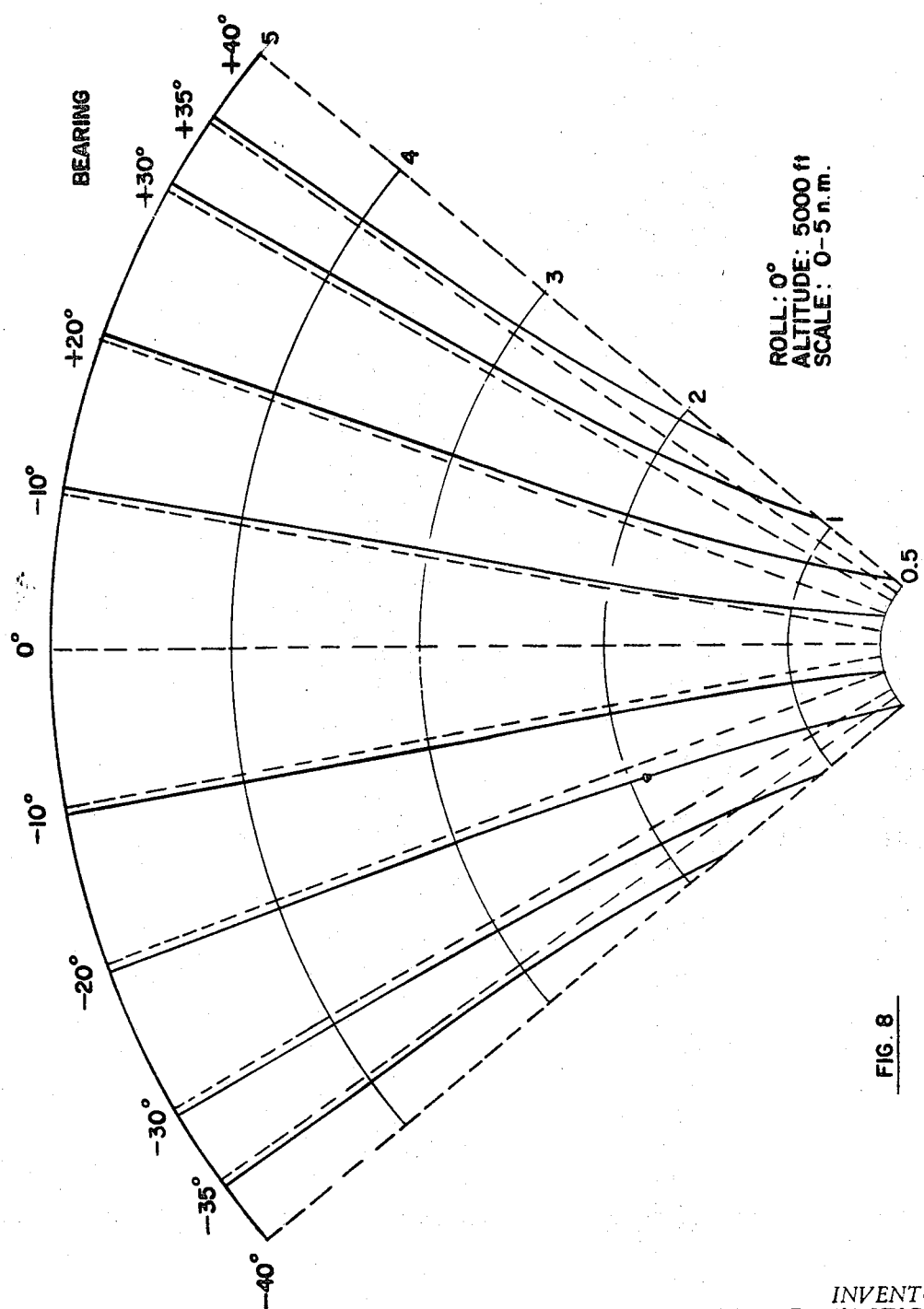
FIG. 8 is a plan position indicator diagram of a typical airborne mapping display under exemplary airborne conditions and demonstrating the typical distortion of the ground map representation in such display.

In a mapping application, the antenna boresight is preselectively depressed in elevation and an antenna beam pattern having substantial elevation extent (vertical fan beam or spoiled beam) is employed. In azimuthally scanning such a beam for a phased array type antenna (as distinguished from a space-stabilized gimballed dis-type antenna), the intersection of the energy tends to follow a conical surface and intersect the ground plane in a directionally curved fashion (relative to a radial array) for azimuth angles off the boresight (or dead ahead) direction, as shown in the exemplary situation depicted in FIG. 8. Such situation occurs due to the fact that the vertical phase gradient of the scanned phased-array provides a fixed depression angle, as seen in that vertical plane containing the physical boresight axis of the array. Thus, as the depressed electronic boresight is scanned right or left, the actual depression angle thereof (in the vertical plane containing the azimuthally scanned electronic boresight) is "spoiled". Also, a given horizontal phase gradient of the scanned phased-array provides an azimuth angle (as seen in the horizontal plane containing the physical boresight axis of the array), the direction of which is "spoiled" or tends to vary with the true depression angle of a component ray of the vertical fan beam response. The compensation for this combined conical projection response may be effected within the beam-steering logic for the phased array; but is more easily compensated for in the display indicator. Such compensation, the need for which is seen (from FIG. 8) to increase as the range decreases (corresponding to an increased component depression angle in an airborne application) and to increase as the azimuth direction is increased from dead-ahead, may be conveniently accomplished in cursor generators used for identifying specific targets and reading out the (corrected) coordinates thereof.

The phased array has two principal performance advantages over conventional mechanically steered antennas. The beam of the array can be directed to any position, and appropriately shaped, within one pulse repetition period. The judicious use of these advantages permits a considerable improvement in achievable search and track rates.

The value of shaped beams to this process is lost, however, unless the beam is maintained in a vertical position, As the antenna rolls, special consideration is required to maintain the vertical attitude of the beam. If the beam is allowed to roll, the azimuth extent of the beam causes excessive smearing of targets.

A straight forward roll stabilization can be achieved by separating the beam shaping and beam steering functions. The approach requires that the summing of steering and shaping phase instructions be done separately for each element. Since three quantities are involved, azimuth, elevation and shaping, the summation can best be done in a central accumulator. The accumulator generates a summation for each element of the array. The combined steering and shaping command can be stored for the next beam at each element location.

Figure 9:
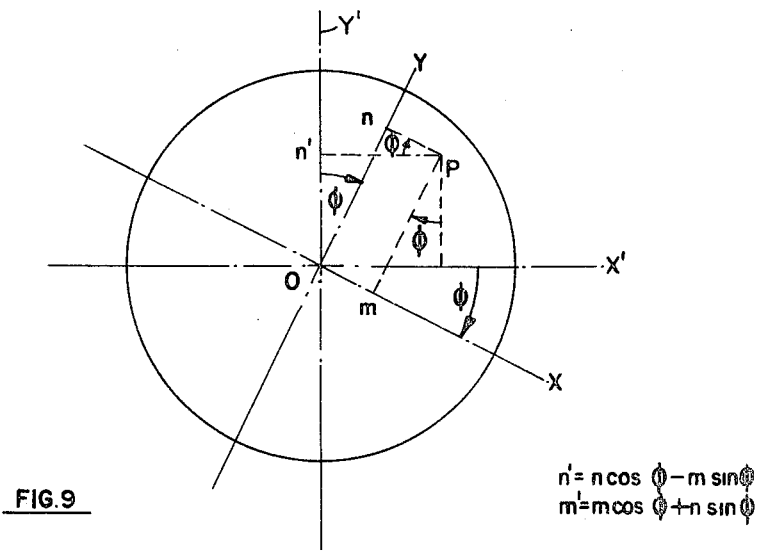
FIG. 9 is a diagram illustrating the typical geometry of a roll-stabilization steering control situation.

The basic requirement for maintaining vertical shaped beams when the antenna has rolled is that the shaping function, $\psi_s$, be stabilized for roll. In FIG. 9, let X and Y be antenna coordinates referenced to the row and columns of the array. Let X' and Y' be in the same plane but referenced to vertical space. The angle, $\phi$, measures the roll of the antenna from vertical about the antenna normal.

The array element located at P is described as being at the intersection of the $m^{th}$ column and $n^{th}$ row. The element at P is always referenced in X-Y antenna coordinates, as the $m$, $n^{th}$ element of the array. The beam steering commands are functions of the m and n location of the element.

Beam shaping for element P will be done in the X', Y' coordinate system. Since shaping is restricted to one plane, only the $n'$ coordinate of P is of interest. The equation for $n'$ is $$n' = -m \sin\phi + n \cos\phi$$

The shaping function $\psi_s$ is a function of $n'$. The particular function is dependent upon the beam shape desired. Once the value of $n'$ is determined the beam shaping phase required for the element can either be calculated or obtained from a read-only memory, as shown in the exemplary roll stabilization mechanization of FIG. 10 whereby the beam steering and beam shaping functions are roll stabilized.

Figure 10:
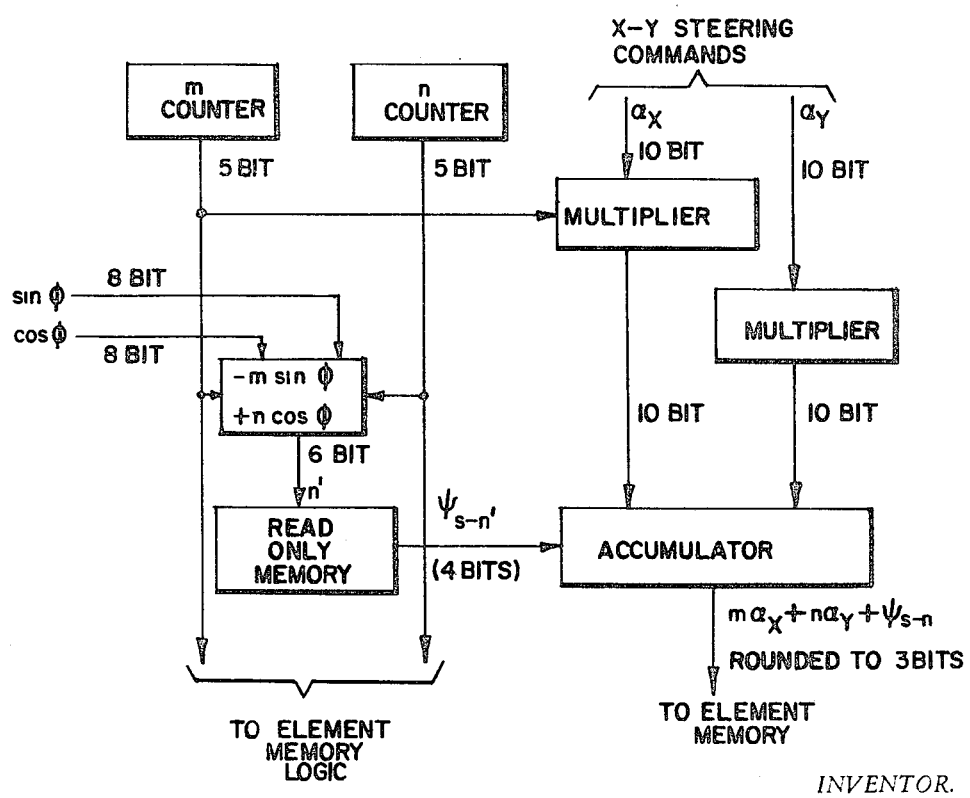
FIG. 10 is a block diagram of an exemplary mechanization for dealing with the roll stabilization steering problem illustrated in FIG. 9.

In such arrangement the equation for $n'$ is solved for each element. Once $n'$ is initialized the next value can be obtained by incrementing the $m$ counter and adding sin $\phi$ to the previous value of $n'$. Only the most significant bits of $n'$ need be decoded for memory addressing. This reduces the required memory size. The memory is also dependent upon the resolution of element phase shifters. In FIG. 10 it is assumed that the phase shifters are 3-bit devices and that each word of memory requires 4 bits of data. A complete fan beam could be stored in 256 bits of high speed read only memory. A csc $\theta$ beam would, because of its lack of symmetry, require 512 bits of storage. These numbers are based upon an array of 64 ⊖ 64 elements and a worst case error in $n'$ of one-fourth the integer value of $m$ and $n$.

Also included in the arrangement of FIG. 4 is slant range compensation means 19 interposed between the output of range time signal generator 16 and the range trace input of display indicator 17 for modulating the range trace input as a function of the target look angle occurring at such slant range time. In other words, the vertical look angle input to compensation means 19 from ranging system 15 modulates the slant range signal output of generator 16 in accordance with the relationship of Equation (1) to provide a range trace signal input to indicator 17 which is indicative of the horizontal range distance $R_h$ associated with the slant range time occurrence of a video signal (on the intensity control input of indicator 17). Thus, map image distortion due to slant range display is avoided.

The design of function generators and modulators for effecting the modulation function of element 19 is well understood in the art. Therefore, such element is shown in block form only for convenience in exposition.

There is also provided in FIG. 4 vehicle motion compensation means 20 responsive to system platform motion and cooperating with display indicator 17 for platform motion compensation of the mapping display provided by the indicator during each azimuth scan. In other words, the prior art moving map display provided by indicator 17 (for an airborne ranging system having a velocity vector with respect to the terrain) is "frozen" at the beginning of each azimuth scan period, each successive range trace (of the plurality of differently azimuth-oriented range traces comprising an azimuth scan) being successively position-biased on the display indicator by an amount corresponding to that change in flight path position of the aircraft from such reference position and associated with such range trace interval. Element 20 is substantially integrating means responsive to the platform or vehicle flight path velocity (as determined by navigation system 18) for providing bias signals indicative of the incremental horizontal motion $\overline{R_n}$, corresponding to the changes of position 10a–10f in FIG. 1. Such signals may be suitably resolved, relative to the map heading reference employed by display indicator 17, for application to the electron beam position bias controls 21 for display indicator 17. Where, for example, the map indicator heading reference corresponds to one of the horizontal coordinates of the navigation system 18, the vehicle velocity output from system 18 may be two output signals representing the resolved horizontal platform velocity; and compensation means 20 then merely comprises two integrators, each responsive to one of the two components of the resolved velocity for providing a corresponding component position bias input to indicator bias insertion means 21.

At the end of each azimuth scan or map frame, the integrators are reset to zero output by a frame trigger signal derived either from the azimuth scan control of ranging system 15 or from that system clock which drives the azimuth scan control. In other words, such frame trigger occurs at a submultiple of the ranging system trigger rate, as indicated by a frame rate frequency divider 22 shown responsively connected to the system trigger.

In ordinary operation, vehicle compensation means 20 cooperates with display indicator 17 to incrementally bias the electron beam reference position controls 21 by a successive amount corresponding to the vehicle motion each successive pulse repetition period, as shown in FIG. 1, whereby the distortions in range, shape and orientation (in the prior art display of FIG. 2) are avoided.

Thus, the avoidance in FIG. 4 of mapping image distortion due to slant range and vehicle motion and attitude is achieved, and a truer map image is provided. Also, because the image elements of a mapping display are more accurately depicted by the display indicator, common image elements of successive range trace signals are more nearly in registry, whereby the signal integration effect of the display tube phosphor is more effectively employed and the data resolution of the radar system is not compromised.

Figure 5:
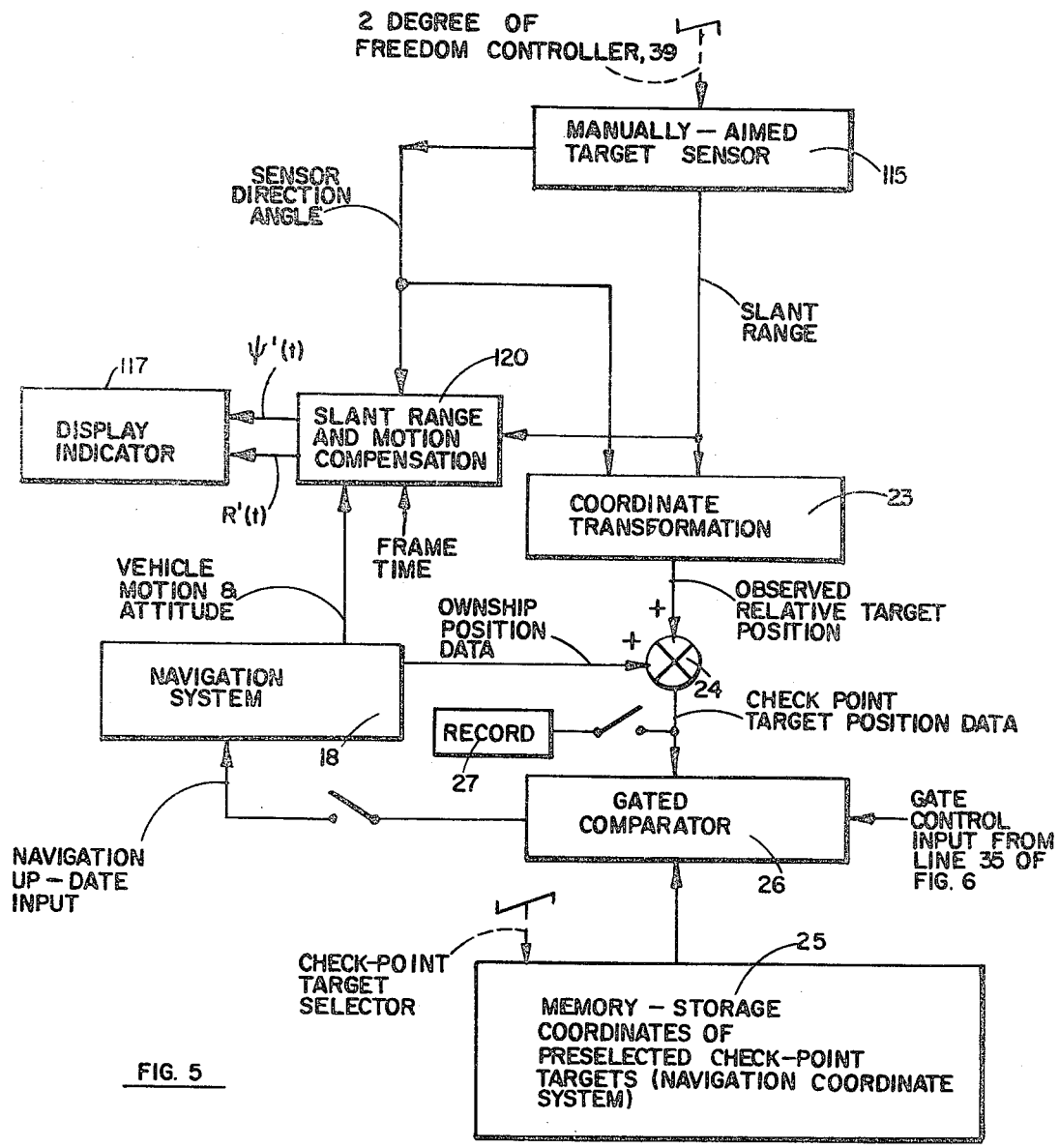
FIG. 5 is a block diagram of a further aspect of the system of FIG. 4 and including navigation check pointing means for monitoring the navigation system of FIG. 4.

A second aspect of the inventive concept relates to the use of a slant-range compensated, directionally ranging system to monitor an automatic navigation system, as shown in FIG. 5.

Referring to FIG. 5, there is illustrated a block diagram of a directionally scannable, or selectively-steerable, directionally-ranging system 115. Directionally ranging means, or target sensor, 115 utilizes a pencil beam antenna pattern which is manually steerable by means of a two-degree-of-freedom controller to display a selected terrain target on a display indicator 117. Navigation system 18 cooperates with slant range compensation and motion compensation means 120, and may also cooperate with target sensor 115 to provide adequate image stabilization of the display provided by display indicator 117 and represented by the display inputs $\psi'(T)$ and $R'(t)$.

There is further provided in FIG. 5 navigation checkpoint means for monitoring the performance of navigation system 18. Coordinate transformation means 23 is responsive to the polar coordinates of the radar target data for transforming the target data from the polar coordinates of the radar system to a set of coordinates compatible with those of the navigation system 18 and employing the same origin as the radar polar coordinate system (i.e., the system platform). The observed position of the target (relative to the platform) is then combined with the platform position data (provided by navigation system 18) by means of data summing means 24, to provide the target position in the navigation coordinate system. The coordinates of the observed target, as provided by the output of element 24, are then compared with those for a selected one (of a number of preselected target positions stored in storage means 25) by comparison means 26.

It is to be understood that the coordinate differences of the resolved position data for the observed target and a preselected mapped target may be indicative of a performance error in the navigation system, where the observed target and the target represented by the stored coordinates are the same target. A mapped natural, or non-cultured, target of a distinctive nature, for example, may be observed by means of the arrangement of FIG. 5 and the measured coordinates thereof compared with the mapped coordinates, to provide a set of monitoring signals at the output of comparator 26 for biasing the drift or updating the performance of navigation system 18.

With navigation system 18 thus checkpointed or updated, the arrangement of FIG. 5 may then be used to determine the coordinates of an unmapped target, such as a cultured or man-made target of recent origin, and the data recorded by a recorder 27.

Figure 6:
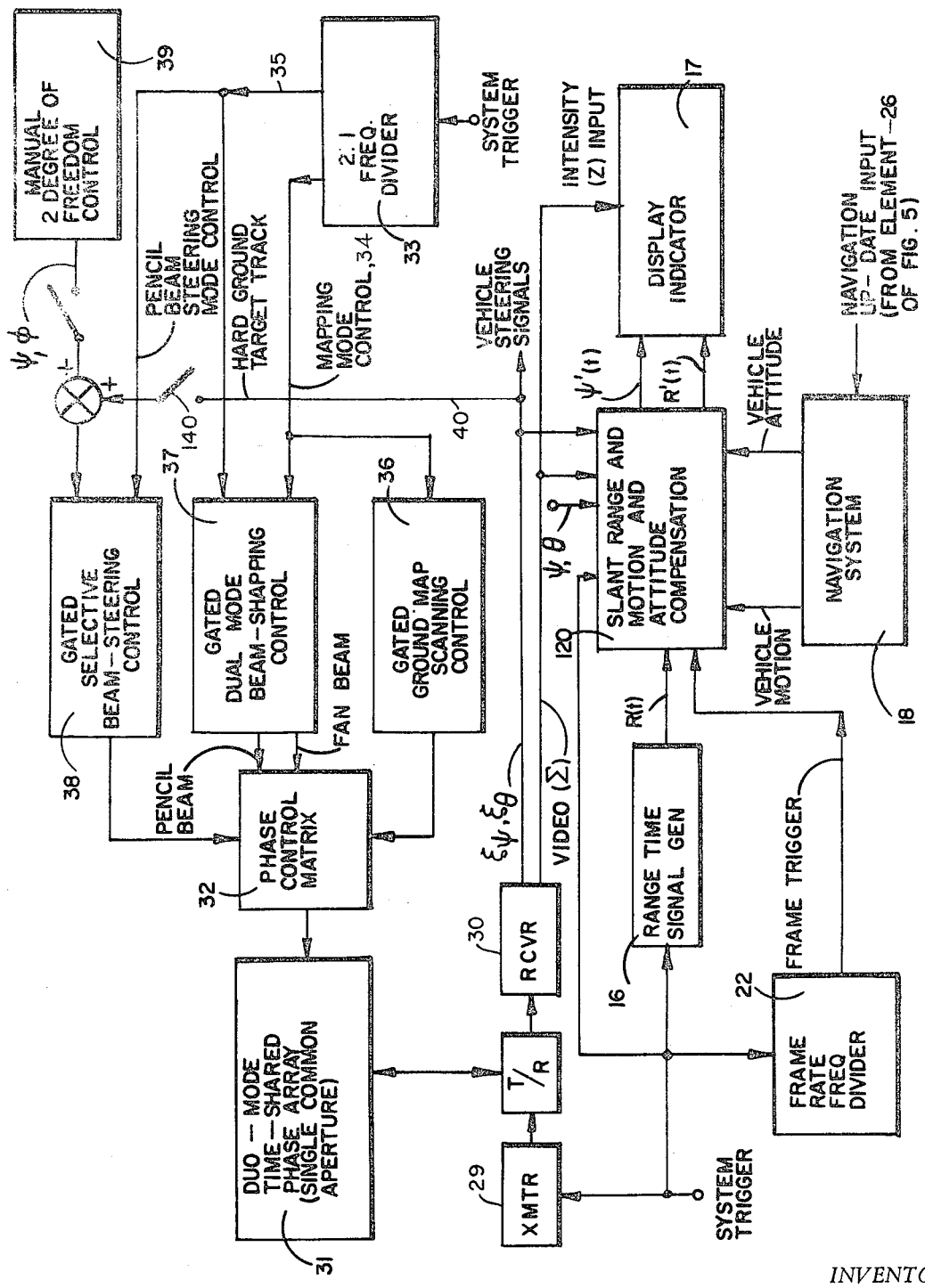
FIG. 6 is a block diagram of a dual mode ranging system embodying both display compensation and navigation system checkpointing functions of FIGS. 4 and 5.

In a preferred embodiment of the invention, the identification of a target of interest, for either navigation checkpointing purposes or target mapping, is more conveniently accomplished by combining the functions of the arrangements of FIGS. 4 and 5, whereby a selected terrain target is displayed against a radar map of the terrain features relative to which such target occurs, as shown more particularly in FIG. 6.

Referring to FIG. 6, there is illustrated in block diagram form a preferred embodiment of the invention for performing the combined functions of mapping and navigation checkpointing. There is provided a multiple mode directionally ranging system corresponding to element 15 in FIG. 4 and element 115 in FIG. 5 and comprising a pulsed transmitter 29 and receiver 30 in cooperation with a phased array antenna 31, the antenna pattern and antenna look-angle direction of which is controlled by a phase control matrix 32. Matrix 32 is programmed to operate antenna 31 alternatively in an azimuthally scanning perpendicular fan mode (corresponding to the mapping mode of FIG. 4) and a steerable, or selectively steered, pencil beam mode (corresponding to the targeting mode of FIG. 5).

Time duplexing control means is provided for time-shared operation of the duo-mode antenna 31 in an alternate one of the mapping and steerable pencil beam modes during successive range trace intervals. An exemplary frequency divider 33 responsive to the system trigger provides a first signal output state on line 34 during alternate system pulse repetition intervals and corresponding to a mapping mode gate control signal. Such gating signal gates on a scanning control logic 36 and a fan beam mode of beam shaping logic 37 for operation of phase control matrix 32. A second signal output state, occurring on line 35 during system pulse repetition intervals intermediate those of the mapping mode, corresponds to a steerable pencil beam mode gate control signal. Such latter gating signal gates-on a pencil-beam mode of beam-shaping logic 37 and also gates-on steering logic 38. Steering logic 38 receives steering signals from at least one of a target tracking mode output of receiver 30 and a two-degree of freedom controller 39 for beam steering control of matrix 32 during the pencil beam mode of antenna 31. Although the interleaving or time-sharing of the steerable beam mode has been indicated as occurring every other pulse repetition interval, a different ratio may be utilized, if desired.

There is also provided a range time signal generator 16, display indicator 17, navigation system 18, frame rate frequency divider 22 and compensation means 120, all constructed and arranged to cooperate similarly as like referenced elements of FIGS. 4 and 5. Element 120 provides slant range compensation and platform motion compensation of the display provided by display indicator 17. Attitude stabilization of the scanning and steering control of antenna 31 may be further provided by navigation system 18, as was similarly discussed in connection with the description of FIG. 4. Because a single common antenna aperture is used for both the fan beam and pencil modes, problems of directional registration of the two modes do not arise.

In normal operation, the time-shared multiple mode system of FIG. 6 is utilized as a mapping system during a first set of alternate pulse repetition periods, whereby a mapping display is provided of a terrain sector of interest. Upon location of a mapped terrain feature of interest in the display, the radar operator may operate the two-degree-of-freedom controller 39 to steer the pencil beam, generated during a second set of alternate pulse repetition periods, to better "illuminate" such terrain feature as indicated by a "brightest" spot occurring at a given azimuth and range on the display indicator, due to the energy concentration provided by the pencil beam mode. Such feature may be of interest for navigation checkpointing, whereby a navigation update input is provided to navigation system 18 by means of the switched output of comparator 26 in the arrangement of FIG. 5. Alternatively, the operator may employ controller 39 in conjunction with the tracking control signals on line 40 from receiver 30 to select and track a given ground target for terminal guidance purposes. Such a target may be discerned directly from the display provided by indicator 17. Alternatively, such a target, where difficult to initially discern, may be located by means of the ancillary arrangement of FIG. 7.

Where a monopulse ranging mode is used to obtain the direction as well as range of a checkpoint, for the calculation of the platform altitude relative to such target, it may be desirable to include a random signal generator in the antenna pointing or steering controls to selectively randomly perturb the boresight direction relative to a reference direction. In this way, the effect of centroid differences in the difference lobe responses of the monopulse system (due to hard targets in addition to the checkpoint target) may be the compensated for by time averaging the resulting altitude determination. In other words, as long as no terrain altitude anomalies exist in the region of the checkpoint target, the height computation does not require the placement of the antenna beam center directly upon the checkpoint target.

Figure 7:
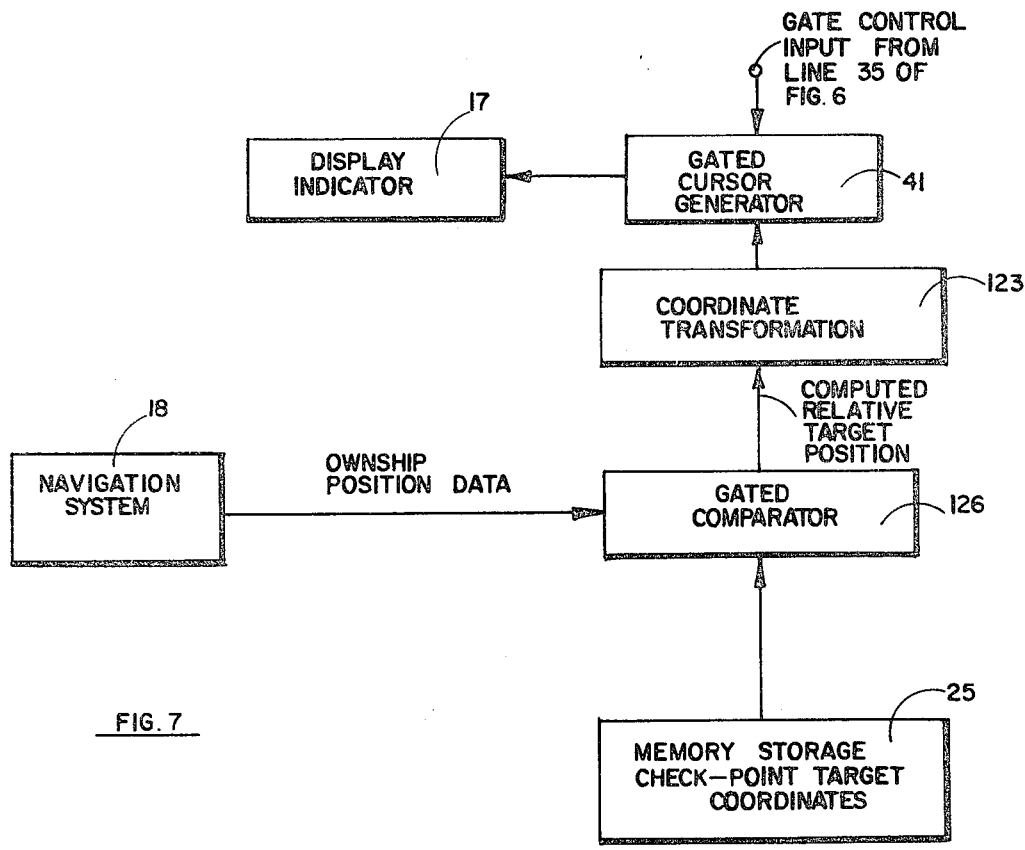
FIG. 7 is a block diagram of a further aspect of the navigation check-pointing feature of FIGS. 5 and 6.

In the ancillary display arrangement illustrated in block diagram form in FIG. 7, are shown elements 17, 18 and 25, corresponding to like referenced elements of FIG. 5 and 6. Memory storage means 25 may include a set of target coordinates corresponding to a terminal guidance target of interest which may be compared by a comparator 126 with the system platform position data provided by updated navigation system 18, to provide a computed relative target position, relative to the system platform. Such relative position data may then be transformed (by transform means 123) into radar system polar coordinates for cursor generator 41 and indicative of the position of such terminal guidance target of interest.

Another application of the ancillary arrangement of FIG. 7 is in aiding the performance of the check pointing of navigation system 18 in FIG. 6. Where the set of target coordinates read-out from memory 25 (of FIGS. 5 and 6) correspond to a preselected checkpoint, the displacement of the display cursor generated by generator 41 (in FIG. 7) relative to the display of the radar target, may be used to indicate the position error or drift performance of navigation system 18 of FIG. 6 and monitor the update function.

Accordingly, there has been described improved radar mapping means in which data smear and image distortion are reduced and in which there is further provided navigation aid means for enhancing a terminal guidance function.

Although the invention has been described and illustrated in terms of an analog block diagram, it is to be clearly understood that digital data processing techniques are also applicable and comprehended for practicing the invention.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a directionally-scannable directionally ranging system adapted for vehicle use in a mapping application and having a display indicator, means responsive to system scanning direction and in cooperation with said display indicator for slant range compensation of the mapping display provided by said indicator and comprising cosine direction matrix means responsive to the vertical look angle of said directional ranging system for compensatorily modulating a range-time signal generator input to said display indicator.

2. In an azimuthally scanning directionally ranging system adapted for vehicle use in a mapping application and having a display indicator, means responsive to platform motion of said system and in cooperation with said display indicator for platform motion compensation of the mapping display provided by said indicator, and comprising means responsive to the velocity vector of said platform motion and to a system trigger of said ranging system for determining changes in vehicle position in a mapping plane during the frame time interval of an azimuth scan, a positional display bias input of said display indicator being responsive to said means for determining changes; and means synchronized with a scanning interval of an azimuth scan mode of said ranging system for resetting said means for determining changes at the end of said scanning interval.

3. In a directionally scannable directionally ranging system adapted for vehicle use in a mapping application and having a display indicator, the combination comprising means responsive to the look angle of said system for modulation of said display indicator to provide slant range compensation of the mapping display provided by said indicator; and means including a navigation system responsive to platform motion of said ranging system for modulation of said display indicator for platform motion compensation of the mapping display provided by said indicator.

4. The device of claim 3 in which said means for motion compensation includes a navigation system and in which there is further provided navigation check point means for monitoring the performance of said navigation system and comprising storage means for storing the coordinates of at least one preselected ground target, and comparison means responsive to said directionally ranging system, said navigation system and said storage means for indicating a position deviation between an observed target and a selected set of said stored target coordinates.

5. The device of claim 4 in which said navigation system is responsive to said comparison means for compensatorily biasing the performance of said navigation system.

6. The device of claim 4 in which said directionally ranging system includes azimuthally-scanning mapping mode means and in which the cooperation of said directionally ranging system is time-shared between said navigation check point means and said mapping mode means, whereby recognition of a selected check point target is facilitated.

7. The device of claim 6 in which there is further included hard-target tracking means for selectively providing a ground target tracking mode to said time-shared ranging system during other than the mapping mode interval of said time-sharing.

8. In a directionally scannable directionally ranging system adapted for vehicle use in a mapping application and having a display indicator responsive to a range time signal generator, the combination comprising means responsive to the look angle of said system for compensatorily modulating the input from said signal generator to said display indicator for slant range compensation of the mapping display provided by said indicator;

means including a navigation system responsive to platform motion of said system for selectively compensatorily biasing said display indicator to provide platform motion compensation of the mapping display generated by said indicator;

storage means for storing the coordinates of at least one preselected ground target; and comparison means responsive to said directionally ranging system, said navigation system and said storage means for indicating a position deviation between an observed target and a selected set of said stored target coordinates, said navigation system being responsive to said comparison means for compensatorily biasing the performance of said navigation system.

9. The device of claim 8 in which said directionally ranging system includes azimuthally scanning mapping mode means and in which the cooperation of said directionally ranging system is time-shared between said navigation check point means and said mapping mode means, whereby recognition of a selected check point target is facilitated, and in which there is further included hard-target tracking means for providing a ground target tracking mode to said time-shared ranging system during other that the mapping mode interval of said time-sharing.

10. A directionally-scannable directionally ranging system having a display indicator and for use in a mapping application, comprising a dual mode antenna subsystem having a single common aperture and adapted to be operated in an alternative one of an azimuthally-scanning perpendicular fan beam mapping mode and a steerable pencil beam mode;

a receiver responsively coupled to said antenna and having a target tracking mode;

time-duplexing control means responsive to a system trigger of said ranging system for time-shared operation of said antenna in an alternate one of said mapping mode and said steerable pencil beam mode during successive range trace intervals;

beam-steering control means for selectively steering said antenna in said pencil beam mode in response to at least one of a receiver tracking error signal and a selected control signal, whereby the situation of a selected ground target may be displayed relative to a mapped area.

11. The device of claim 10 in which there is further provided navigation checkpoint means for monitoring the performance of a navigation system and comprising data storage means for retrievably storing the coordinates of at least one preselected ground target;

comparison means responsive to said ranging system and to said storage means and adapted to be further responsible to a navigation system-to-be-monitored for indicating a position deviation between an observed target and a selected set of said stored target coordinates.

12. The device of claim 10 in which there is further provided navigation checkpoint means for monitoring the performance of a navigation system and comprising coordinate transformation means responsive to said ranging system during said beam steering mode for transforming polar coordinate position data of a selected target relative to said ranging system into a coordinate system compatible with that of said navigation system;

position data combining means responsive to said transformed relative position target data and adapted to be responsive to a platform position output of said navigation system for providing signals indicating the position of said target relative to a position reference in the coordinate system of said navigation system;

data storage means for storing the coordinates of at least one preselected ground target; and comparison means responsive to said data combining means and to said data storage means for indicating a position deviation between an observed target and a selected set of said stored target coordinates.

13. In an azimuthally scanning, directionally ranging system having a display indicator and adapted for airborne use in a ground mapping application, navigation checkpoint means for cooperation with a navigation system and comprising means adapted to cooperate with said navigation system for compensatorily modulating said display indicator for system platform motion occurring during the period of each azimuthal scan, whereby the mapping display provided by said display indicator is referenced to a selected position and heading in a selected horizon plane;

checkpoint means cooperating with an aperture and said indicator of said directionally ranging system for determining motion of said system platform relative to a selected target displayed by said display indicator; and navigation monitoring means responsive to the difference between said platform motion determined by said checkpoint means and platform motion sensed by said navigation system for adjusting said navigation system so as to reduce said difference.

14. The device of claim 13 in which said navigation monitoring means comprising coordinate transform means for transforming the coordinates of said platform motion determined by said checkpoint means to ones substantially parallel to those of said platform motion sensed by said navigation means; and data combining means responsive to said coordinate transform means and adapted to be responsive to preselected coordinates of said selected target for expressing the coordinates of said determined system platform motion in the coordinate system of said navigation system.

* * * * *